United States Patent

Wilson et al.

[15] 3,700,840
[45] Oct. 24, 1972

[54] ISOLATING SWITCH

[72] Inventors: John R. Wilson, Westmont, Ill.; Arthur B. Niemoller, Cincinnati, Ohio

[73] Assignee: Westinghouse Electric Corporation, Pittsburgh, Pa.

[22] Filed: Feb. 11, 1971

[21] Appl. No.: 114,631

[52] U.S. Cl. ..........................200/48 R, 200/170 A
[51] Int. Cl. ..............................H01h 31/24
[58] Field of Search..200/48 R, 148 R, 148 D, 170 A

[56] References Cited

UNITED STATES PATENTS

| | | | |
|---|---|---|---|
| 3,254,185 | 5/1966 | Adkins | 200/148 R |
| 2,458,792 | 1/1949 | Nijland | 200/48 R |
| 2,813,179 | 11/1957 | Rugg | 200/48 R X |
| 2,889,435 | 6/1959 | Albright | 200/48 R X |
| 2,889,436 | 6/1959 | Albright | 200/48 R X |
| 3,348,001 | 10/1967 | Upton et al. | 200/48 R |

*Primary Examiner*—H. O. Jones
*Assistant Examiner*—William J. Smith
*Attorney*—A. T. Stratton and Clement L. McHale

[57] ABSTRACT

An isolating switch comprising cylindrical hollow conductors capable of carrying high electrical currents and mounted within gas filled, sealed cylindrical enclosures for insulating purposes. The switch when open provides an insulating gap for withstanding high voltages. The gap is bridged when the switch is closed by a telescoping bridging members. This bridging member retracts inside one of the associated hollow poles or conductors when the switch is opened, and extends to bridge the gap between the two cylindrical poles when the switch is closed thus providing a continuous electrical path from one pole to the other. The contacting member is moved by a suitable driving mechanism. During the closing of the switch, mechanical or structural contact between the poles or conductors to be connected is made prior to electrical contact. This is done by actuating the bridging member to move axially from within its recess in one hollow conductor toward the other conductor where it joins mechanically with or engages a guiding means and then expands radially outwardly to make electrical contact with the insides of both the associated hollow conductors simultaneously.

12 Claims, 7 Drawing Figures

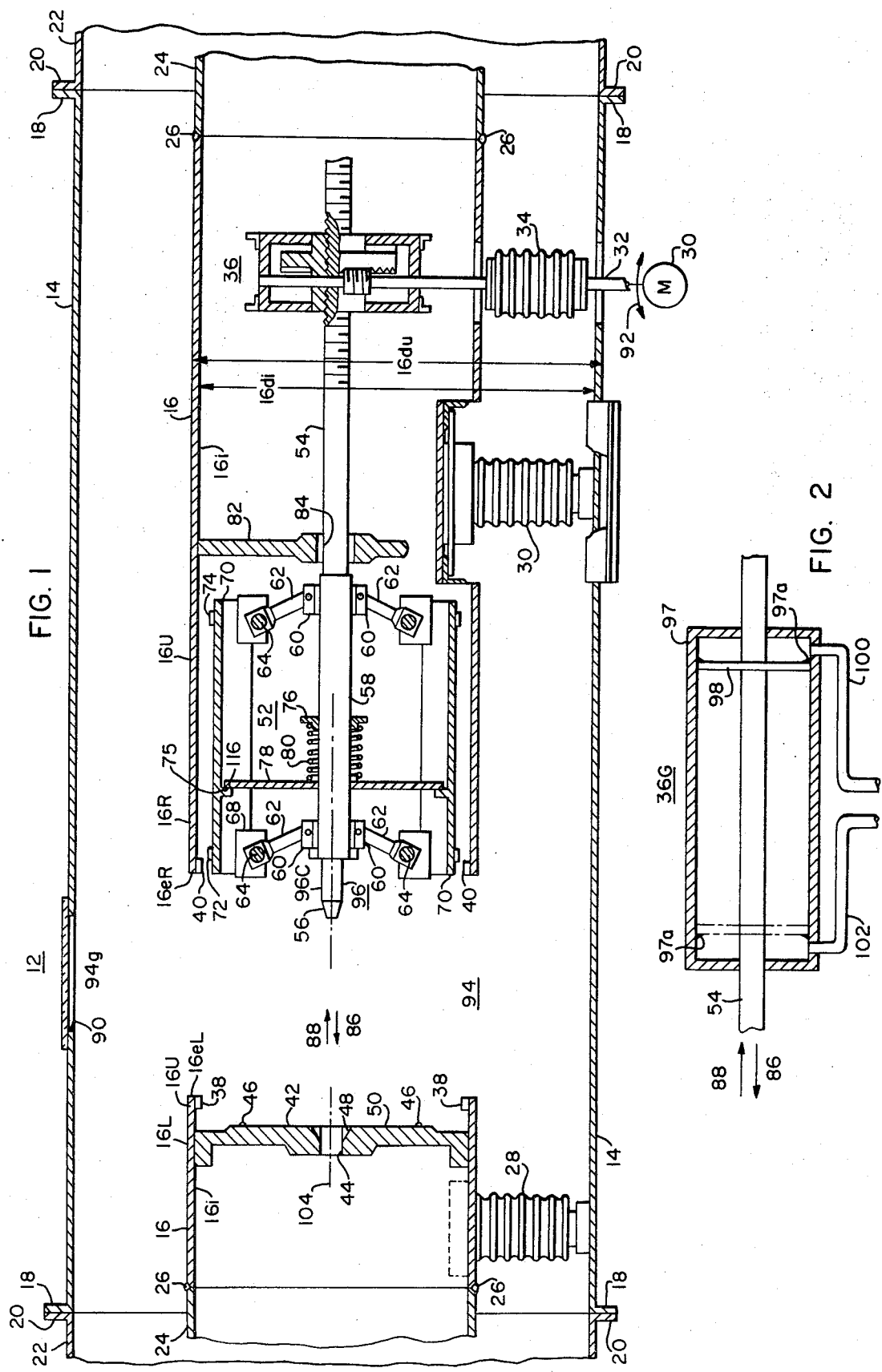

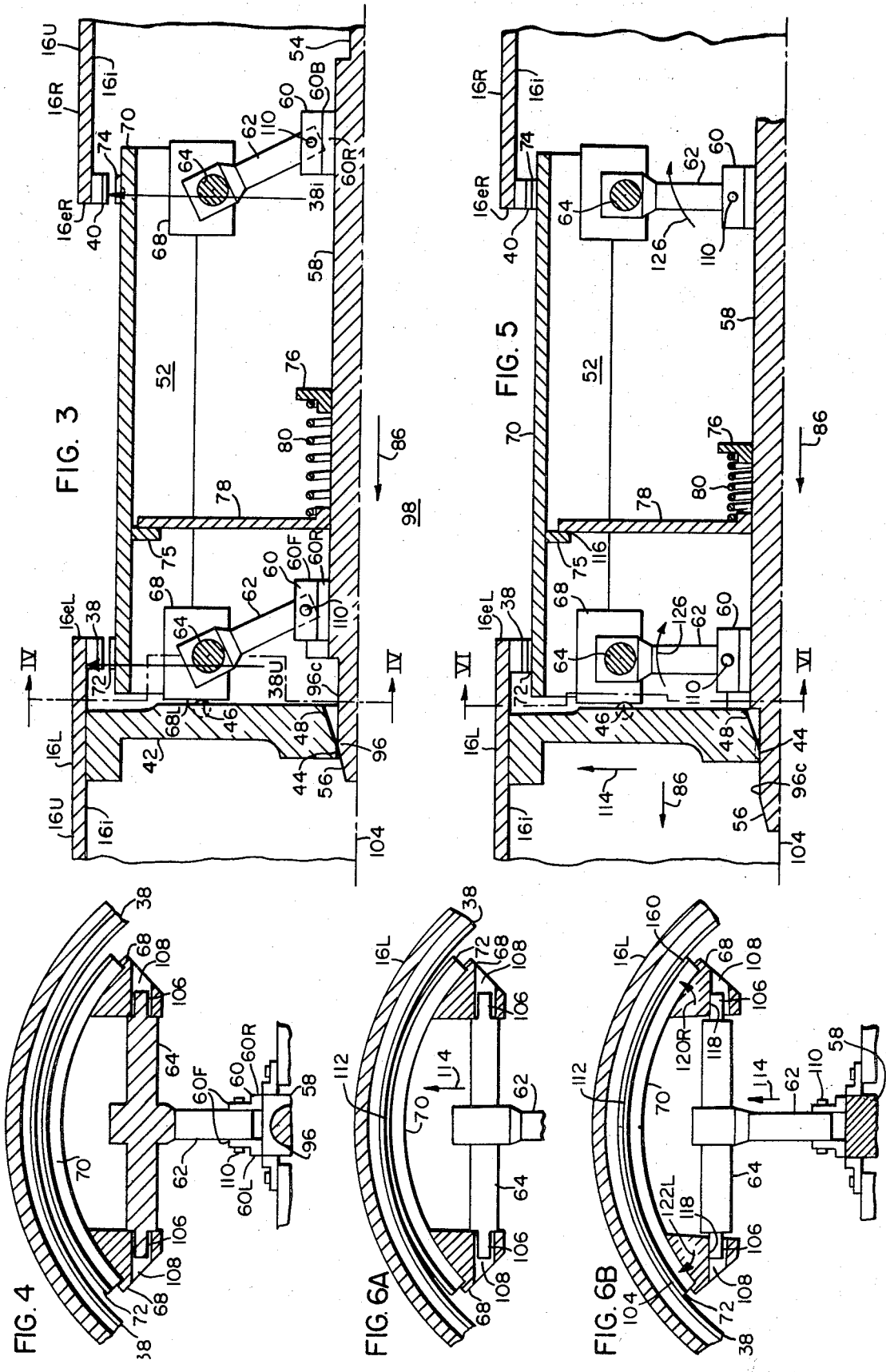

ISOLATING SWITCH

CROSS REFERENCES TO RELATED APPLICATIONS

Certain inventions related to those disclosed in the present application are disclosed and claimed in copending application Ser. No. 114,628 filed concurrently by E. W. Kuhn and assigned to the same assignee as the present application.

BACKGROUND OF THE INVENTION

This invention relates to isolating or disconnect switches and more particularly to electrical contact structures and mechanisms for such switches.

In certain types of electrical apparatus, such as isolating switches of the type disclosed in U.S. Pat. Nos. 3,348,001 and 3,356,798 and assigned to the same assignee as the assignee of the present application, the movable conducting means has the dual responsibility of providing a structural link between two spaced conductors or poles and also carrying current between them. As a result, such a switch structure must provide both the mechanical characteristics necessary for proper linking or connection and the electrical characteristics necessary for proper conduction so as to provide an apparatus which accomplishes both purposes as efficiently as possible.

However, it would be desirable to operationally separate these two requirements or functions whereby the mechanical linking or connecting structure could be provided substantially independently of the electrical requirements associated with the electrical conducting means and vice versa.

SUMMARY OF THE INVENTION

In accordance with the invention, a pair of generally cylindrical or tubular conducting and supporting means are separated by an insulating gap. These means are mounted within a gas containing chamber or housing with the gas acting as an insulating means or dielectric medium which is particularly important in the region of the gap. One of the tubular, electrically conducting supporting means is adapted to house a movable bridging means or assembly. This bridging means when actuated from within the associated supporting means toward the other electrically conducting supporting means provides an electrically conducting path means between the two cylindrical supporting means when fully extended and engaged. The other supporting means has a receiving element, more specifically a disc-shaped means with a diameter which is generally equal to the inside diameter of the cylindrical supporting means in which it is mounted and having a central opening or hole. The central opening acts as a receptacle or guide for the associated bridging means. The bridging means is mounted on a drive shaft, one end of which is adapted to project into the central opening of the receiving or guiding means. The other end of the drive shaft is operatively connected to a suitable actuating means, such as a rack and pinion gear assembly or a hydraulically driven piston. The movable bridging or movable bridging means has disposed thereon a plurality of engaging and electrically conducting means which are disposed to surround it in a generally cylindrical pattern. In one embodiment of the invention, the bridging means includes four of the latter means. Each of the latter means comprises a pair of movable levers each attached at one end to the associated drive shaft, and supported for rotation on said shaft in one plane. Each pair of levers is mounted tandemly or axially spaced along the drive shaft and connected at their other respective ends to axles which are, in turn, each pivotally connected to a pair of supporting blocks. A generally planar, curved electrically conducting plate is mounted on the axially spaced pairs of blocks which form part of each engaging means. Each curved or arcuate plate may have a radius of curvature relatively smaller than the radius of curvature of the inner surface of the previously mentioned tubular supporting and conducting means. In addition, a degree of lateral freedom of movement is provided in the mounting blocks to allow each curved plate to change its radius of curvature slightly while remaining in assembled relationship with the associated axles.

In order to insure that the curved plates of the engaging means are actuated to or retained in positions which are radially spaced inwardly from the associated cylindrical conductors, a biasing spring is disposed on the drive shaft. In addition, the drive shaft has mounted on it an abutment or spring seat and each of the curved plates has a separate abutment mounted at the inner periphery thereof. Disposed axially between the spring seat on the drive shaft and the abutments on the curved plates is a plate which extends radially outwardly from the drive shaft and includes a central opening through which the drive shaft is adapted to move axially. The last-mentioned plate may be disc-shaped and sufficiently large in diameter to engage the abutting means which are disposed on the inside of the associated curved plates even when the curved plates are fully actuated outwardly in a radial direction. The biasing spring is constrained at one end by the abutment mounted on the drive shaft and at the other end by the radially extending plate which is, in turn, constrained by the system of abutments provided on the curved plates.

One wall of the receiving means has bearing surfaces on it such that as the drive shaft is actuated axially from one cylindrical conductor toward the other, one end of the drive shaft makes contact with and seats in the guiding means to establish a mechanical bridge between both of the tubular supporting conductors. The leading edges of the mounting blocks supporting the first lever of each pair of tandemly mounted levers engages a bearing surface on the guiding means and the axial motion of the drive shaft is partially translated to lateral or radial motion of the four separate conducting segments of the engaging and contacting means causing the associated mounting blocks to move radially outwardly. This movement actuates the curved plates to also move radially outwardly toward the inner peripheries of the associated cylindrical conductors or poles. Each engaging means includes a pair of spaced, raised contact ring segments which are mounted at the opposite ends of each curved plate. Each pair of contact ring segments is substantially aligned with a corresponding pair of contact rings mounted on the inner peripheries of the associated tubular supporting and conducting means. All contact rings are made of electrically conducting material. As the aligned ring segments on the outwardly moving curved plates approach the contact rings of the two tubular supporting conductors, the previously mentioned biasing spring is compressed between the radially extending plate and the abutment on the moving shaft. Subsequently, electrical contact is made as the approximate center of each of the rings on each of the outwardly moving curved plates makes contact with the corresponding contacting segments on both of the tubular conductors. Contact may be made tangentially at one point at the approximate center of each contact segment and the adjacent contact ring. Further movement of the associated levers cause the effective contact area to increase as the radius of curvature of the curved plate is changed until substantially complete electrical contact is then made between the contact segments and rings associated with both tubular conductors and the plurality of engaging means through the previously mentioned rings and the curved plates.

BRIEF DESCRIPTION OF THE DRAWINGS

FIG. 1 shows a side elevational view in section, of an isolating switch with a bridging member, in section, which forms part of the switch in its open position;

FIG. 2 shows a side view of a fluid actuated driving mechanism for use with the switch shown in FIG. 1;

FIG. 3 shows a cut-away side view of a quarter-section of the bridging mechanism shown in FIG. 1, in the intermediate closed position;

FIG. 4 is a sectional view of the mechanism shown in FIG. 3 taken along lines IV—IV;

FIG. 5 is a cut-away side view of the mechanism shown in FIG. 3 with the bridging member in a completely closed position;

FIG. 6a is a sectional view of the mechanism shown in FIG. 5 taken along line VI—VI with the contact members engaging at one point only;

FIG. 6b is a sectional view of the mechanism shown in FIG. 5 taken along line VI—VI with the contact members completely closed.

DESCRIPTION OF THE PREFERRED EMBODIMENT

Referring now to the drawings, and FIG. 1 in particular, a side view of a switch 12, which may be used in isolated phase bus duct, is shown. Switch 12 comprises an outer shell or container 14 which is generally tubular in shape. Mounted generally concentrically within outer tube or pipe 14 is an electrically conducting inner tube or shell 16 suitable for carrying the full amount of current which must be carried by switch 12. Outer housing or containment vessel 14 is adapted to contain a gas, such as sulfur hexafluoride ($SF_6$), for electrically insulating purposes and is thus built to be substantially fluid tight. In keeping with this requirement, outer tube 14 includes flanged ends 18. The flanged ends 18 are adapted to be assembled in a fluid tight joint with corresponding flanges 20 on the associated electrical apparatus, which may be an isolated phase bus duct containment vessel or housing 22. Mounted within isolated bus duct outer housing 22 is the current carrying inner tube or cylinder 24 which is formed from electrically conducting material and which is adapted to be attached, such as by welding or bolting to the current carrying tube or cylinder 16 of switch 12. A weld joint may be made at each of the junctions 26 between the respective ends of the conductor 16 and the conductors 24 which may comprise part of an external electrical circuit. Inner cylindrical tube or generally fixed supporting means 16 is spaced from and mounted within outer tube or containment vessel 14 by an axially spaced pair of electrical insulators or stand-off supports 28 and 30. These supports may be similar to the type disclosed in detail by A. B. Niemoller in U.S. Pat. No. 3,351,705 and assigned to the same assignee as the assignee of the present invention. Mounted externally to outer containment vessel or cylinder 14 is a power source or motor 30. The actuating torque from motor 30 is transmitted into the fluid tight containment vessel 14 through fluid tight porthole 32 by means of an electrically insulating shaft 34. Shaft 34 is operatively connected to a rack and pinion gear assembly or similar driving assembly 36, the operation of which will be described hereinafter. Current carrying cylinder or conductor 16 has a tubular or generally hollow left section 16L and a tubular hollow right section 16R both open at the adjacent, spaced ends 16eL and 16eR, respectively. Portions or sections 16L and 16R are so disposed within containment vessel or cylinder 14 which is also substantially filled with an electrically insulating medium to prevent a high voltage flashover between conductor portions 16L and 16R when the switch 12 is open. Both conductor portions are disposed along a common centerline or axis as indicated at 104. In addition, due to the presence of the sulfur hexafluoride gas or a similar insulating or dielectric medium, any flashover or breakdown between outer cylinder or housing 14 and inner current carrying conductor 16 is prevented. Cylindrical conductor 16L comprises inner and outer surfaces 16$i$ and 16$u$, respectively. Cylinder 16R similarly includes inner and outer surfaces 16$i$ and 16$u$, respectively. Surface 16$i$ has a diameter 16$du$. Generally, sections or portions 16L and 16R may be formed as hollow cylindrical or tubular structures which are suitable for carrying relatively high electrical currents and for supporting various mechanisms, said tubular structures generally having respective corresponding equal inner and outer diameters.

Tubular member 16L has an open end 16EL and tubular member 16R has an open end 16ER. Mounted adjacent the axially spaced ends 16EL and 16ER on inner surfaces 16$i$, respectively, of the tubular members 16 are electrically conducting rings or electrically conducting contacting means or segments 38 and 40, respectively. The rings 38 and 40 are generally rectangular or square in cross-sectional shape. The outer diameters 38$u$ and 40$u$ of the ring shaped metallic, electrical conductors 38 and 40, respectively, correspond generally to the inner diameters of surface 16$i$ of conducting cylinders 16L and 16R, the rings also having inner diameters 38$r$ and 40$i$, respectively. Also mounted at the inner surface 16$i$ of conducting member 16L is a disc-shaped receiving means 42 with a central hole or recess 44. Disc 42 has ball bearing surfaces 46 disposed thereon and a truncated conical receiving surface 48 at its front end 50. The function of the truncated conical receiving opening or recess 48 will be described more fully hereinafter.

Switch bridging member 52 which is shown positioned within section 16R and supported for movement into and out of it, comprises a plurality of important elements as shown in FIGS. 1 and 4. Switch bridging member 52 comprises a plurality of four identical portions, one of which is shown in FIG. 4. All of these portions operate simultaneously to provide a current carrying path between conductor 16L and conductor 16R when the switch 12 is closed.

The switch 12, which is shown in FIG. 1 in its open operating position, comprises a shaft or main body or a movable supporting means 54 which is operatively connected at one end to rack and pinion or similar mechanism 36 and at the other end to guiding means 96. Between guiding means 96 and the rack and pinion mechanism 36, the main body or shaft 54 comprises a generally square or rectangular cross-sectional supporting section or member 58. Referring again to FIG. 4, upon member 58 is mounted an engaging means comprising four sets of lever mounting blocks or inner anchoring means 60, each set comprising a tandemly mounted spaced pair of supports 60F and 60B, each pair of supports comprising a left section 60L and a right section 60R. Pivotally connected or attached to each of these pairs of supports 60 is a pair of levers or connecting rods 62. The switch 12 therefore includes a total of eight levers 62, four disposed toward the front and four disposed toward the rear of the member or shaft 58. At the other end of each lever 62 is mounted a cylindrical axle or shaft 64. Shaft 64 extends through and is rigidly secured to lever 62. Each shaft 64 is pivotally connected to a pair of mounting blocks which are disposed at the opposite ends 106 of said shaft. Attached or secured to the mounting blocks or outer anchoring means 68 associated with each pair of levers 62 is a generally arcuate or curved electrically conducting or contacting means 70 with a pair of mounting blocks 68 disposed adjacent to each end of the contacting means 70. On the front and rear ends of curved plate 70 at the outer periphery are mounted electrically conducting rings 72 and 74, respectively, which each form substantially a quarter arc of a circle as does curved, generally rectangular plane or plate 70. Conductors 72 and 74 are electrically connected to plate 70 and the axial distance between conductors 72 and 74 is substantially the same as the distance between similar electrical conductors 38 and 40 on conducting cylinders 16L and 16R, respectively.

Also mounted on each curved plate 70 is an abutment or stop 75. Mounted on square shaft 58 is another abutment 76. Abutment 75 is engaged at one side by radially extending plate 78, at location 116. Pressure plate 78 is held firmly or biased against the abutment or abutting means 75 by biasing spring 80 which, in turn, is prevented from expanding longitudinally by the previously mentioned abutment or spring seat member 76 provided on shaft 58. The interface 116 between abutment 74 and plate 78 also acts as a bearing surface such that abutment 74 may move or slide tangentially with respect to pressure plate 78 or radially with respect to the shaft 58.

Mounted within conducting segment 16R is a third at least partially disc-shaped supporting means 82 as shown in FIG. 1. The outer diameter of supporting means 82 is substantially equal to the diameter of inner surface 16i of conducting cylinder 16R and is firmly secured thereto. Disc 82 has a central hole or opening 84 through which the shaft 54 passes to thereby support shaft 54. Disc 82 is mounted within conducting cylinder 16R between the rack and pinion gear mechanism 36 and end 16R of conducting cylinder 16R. It partially supports shaft 54 and the bridging member 52. It also allows bridging member 52 to be moved longitudinally or axially in the direction of arrow 86 to close switch 12 and in the direction of arrow 88 to open it. The outer cylinder or shell 14 of switch 12 has a porthole 90 having a transparent cover through which the engagement or disengagement of bridging member 52 with sections 16L and 16R may be observed. As motor 30 rotates, the rack and pinion mechanism 36 translates the rotary motion 92 of motor 30 into lateral or rectilinear motion 86 or 88 depending upon the direction of rotary motion 92 of motor 30 causing the entire bridging means 52 to move in the direction of arrow 86 or arrow 88 depending on whether it is desired to close switch 12 or open it respectively. Assuming that the switch 12 is to be closed, motor 30 is energized to rotate in such a direction as to cause switching means 52 to move in the direction of arrow 86. When the bridging means 52 has completely moved across gap 94, guiding hub 96 will engage the central hole or opening 44 of receiving means 42 in the vicinity of the truncated part 48 of the hole 44 and seat itself firmly. The corresponding or complementary truncated section 56 of guiding means 96, thus establishing mechanical contact between bridging means or switch 52 and receiving means 42. As the bridging means 52 continues moving in direction 86, the cylindrical part 96C of guiding means 96 fits snugly into hole 44 and projects through it as shown in FIG. 3.

Until this point during a closing operation, none of the parts of the switch or bridging means 52 have begun any relative movement with respect to shaft 58 since mechanical contact only is made between left member 16L and right member 16R and the primary electrical conducting portions of switch 12 have not yet engaged.

Referring now to FIG. 2, an alternative driving mechanism 36G is shown which comprises, a casing or pressure vessel 97 which is adapted to receive high pressure fluid, a movable piston 98 and shaft 54 capable of moving in direction 86 or 88. In addition, two tubes or pipes 100 and 102 are connected to containing vessel 97 to allow fluid to be injected either behind piston 98 or in front of it, depending upon which direction shaft 54 is sought to be moved. If shaft 54 is to be moved in direction 86, which corresponds to a closing operation of switch 12, high pressure fluid is passed through pipe or line 100 from a point external to outer tube 14 of switch 12 causing piston 98 to move to the left or in the direction 86. If bridging member 52 is to be moved to the right to open switch 12, fluid may be inserted or introduced through pipe 102 causing piston 98 to move to the right. As can be seen, fluid mechanism 36G may be employed as an alternative for rack or pinion mechanism 36.

Referring now to FIGS. 3 and 4, it can be seen that as bridging member 52 is moved axially completely across gap 94, it is substantially aligned between conducting cylinders 16L and 16R such that ring 72 is substantially aligned with ring 38 and ring 74 is substantially aligned with ring 40. Each block or supporting means 68 is disposed substantially flush against or is engaging bearing surface 46 at the leading surface 68L as shown in FIG. 3. In addition, the circular part 96C of shaft 58 is snugly fit into hole or opening 44 while the truncated part 56 of the shaft 58 has protruded through hole 44. It will be noted that this view is a one-quarter view extending radially outwardly from centerline or axis 104.

FIG. 4 shows a sectional view along line IV—IV, it will be noted that each block 68 is supported by an axle or cylindrical member 64 which is, in turn, held in place by rod or lever or toggle 62. At each end of axle 64 is relatively smaller cylindrical fitting or shaft member 106 which is rotatably disposed in hole 108 in the associated block 68. As shown in FIGS. 3 and 4, curved plate 70 has not yet made contact with conducting cylinder 16 and conducting segments or partial rings 72 and 38 and 74 and 40, respectively, have not yet made contact with or engaged each other.

Referring now to FIGS. 5, 6a and 6b, it can be seen that as shaft 58 is actuated further in direction 86, the cylindrical portion 96C of shaft 58 moves farther to the left through hole 44. However, each block or supporting means 68 does not move further in direction 86, rather it moves generally radially in direction 114 away from the shaft 58. In addition, abutment 76 which is rigidly attached to rectangular or square shaft 58 causes spring 80 to be compressed against pressure plate 78 which is, in turn, held in place by abutment 75. As shaft 58 continues to move in direction of arrow 86, toggle member or lever 62 is caused to rotate in a clockwise direction 126 about pivot pin or shaft 110 as viewed in FIGS. 3 and 5, causing block 68 to move upwardly or radially outwardly from the shaft 58 in direction 114. Abutment 74 simultaneously moves upwardly in this same direction against the bearing surface of pressure plate 78 in the vicinity of surface 116. When this happens, each conducting plate 70 also moves upwardly or radially outwardly from the shaft 58 in direction 114 because of the restrictions provided on the movement of each plate 70. Consequently, the substantially aligned conducting rings 72 and 38 as well as conducting rings 74 and 40 respectively are caused to engage or contact each other. This operation forms a direct electrical connection or conducting path between cylinder 16L and cylinder 16R, thus substantially completing a closing operation of the switch 12. However, it will be noted by referring to FIG. 6a that the clockwise rotation or movement of toggle member or lever 62, in direction 126 as shown in FIG. 5, only actuates plate 70 to make contact with or engage cylindrical contacting means 16L at ring 38 and ring 72 at one tangential point 112. This is because the radius of curvature of contacting ring segment 38 is relatively larger than the radius of curvature of ring segment 72 on curved conducting plate 70. To insure further electrical contact between conducting cylinder 16L and flexible curved plate 70, it is necessary to move shaft 58 slightly further in direction 86. This further movement of the shaft 58 causes cylindrical surface 86C to move further through hole 44 and also causes toggle rod or lever 62 to assist in completing the connection between curved cylinder 16L and flexible curved plate 70 by forcing blocks 108 radially outwardly from the shaft 58 and upwardly in the directions 122L and 120R as shown in FIGS. 5, 6a and 6b due to the forces exerted against inner surfaces 118 of holes 108 in blocks 68. It will be noted that cylindrical portions 106 of each shaft 54 do not fit snugly in the associated holes 108. This arrangement allows block 58 to rotate or swivel slightly outwardly in directions 120R and 122L so that each partial ring or segment 38 makes substantially complete contact with inner contacting ring 72 along substantially its entire surface as indicated from point 140 through point 112 through point 160 in FIG. 6a thus completing the electrical connection between conducting cylinder 16L and each movable conducting surface 70.

Referring again to FIG. 5, a similar action or operation takes place concurrently with respect to the rear conducting cylinder 16R and conducting plate 70. Thus a snug pressure fit results between the respective engaging parts due to the total action of all rods or levers 62 being actuated to rotate about pivot pins or shafts 110 in a clockwise direction 126 as viewed in FIG. 5 causes curved flexible plate 70 to establish high pressure electrical contact between conducting surfaces 72 and 74 on pressure plate 70, and 38 and 40 on conducting cylinders 16L and 16R, respectively. Electrical continuity is thus established from conductor 16L through conducting ring 38 on cylinder 16L, through conducting ring 72 on flexible conducting surface of plate 70, through conducting plate 70, through conducting ring 74 on the conducting surface of plate 70, through conducting ring 40 on the inner perimeter of conducting cylinder 16R to conducting cylinder 16R. This closes switch 12 and completes electrical continuity independently of the initial mechanical or structural engagement which had been established between each movable bridging means 52 and third supporting means 52.

It is to be understood that the teachings of the invention may be employed in other types of circuit interrupters in addition to an isolating switch, such as in a circuit breaker. The insulating medium may be other than sulfur hexafluoride: for example, it may be a vacuum or evacuated space, or an air or fluid filled space. It is also to be understood that in practicing the disclosed invention any type of driving mechanism or means which actuates axial or longitudinal movement of rod 54 may be used as an alternative to the mechanisms 36 or 36G. It is to be noted that the disclosed switch structure can be applied in any type of circuit interrupter where a movable conducting member first makes mechanical or structural contact with an associated receiving means and then electrical contact with an associated conducting member. Although the first embodiment of the invention illustrates the invention with a four section toggle mounted bridging or switching member it is to be understood that multisectional switches incorporating the invention may include more or less than four sections in a particular application. The plurality of sections need not be symmetrical with respect to the centerline 104. In addition, the spring 80 may be replaced by any biasing means such as a resilient or elastomeric material, such as rubber.

The apparatus embodying the teachings of this invention has several advantages. For example, a switch structure is disclosed in which mechanical contact is established between cooperating conducting members first to provide a structural connection between the conducting members and then subsequent operation of the switch results in electrical contact between the conducting members. Certain parts of the switch which assist in establishing structural contact may also be employed for electrical conduction. The firm structural connection that is initially established can then be employed as a structural means to establish high pressure electrical contact in a switch structure which is uniquely adapted to conduction of relatively large values of electrical current. In addition, the disclosed switch is adapted to be installed easily and conveniently in isolated phase bus duct equipment by suitable means, such as welding or other joining means.

We claim as our invention:

1. An electric switch comprising first and second spaced, generally fixed supporting means, each of said fixed supporting means having secured thereto an electrically conducting contacting means, a movable supporting means, said movable supporting means having mounted thereon a movable engaging means, said movable engaging means having disposed thereon a second electrically conducting contacting means, said movable supporting means being actuable to move to actuate said movable engaging means to move and to cause said second contacting means to generally simultaneously engage both of said contacting means on said supporting means to thereby provide electrical continuity from one said first contacting means to the other of said first contacting means.

2. An electric switch as claimed in claim 1 wherein said first and said second generally fixed supporting means are hollow, tubular and electrically conducting and have generally circular peripheries with generally equal respective inner and outer diameters, said first and second supporting means being spaced along a common center line and being open at both ends, said movable supporting means being actuable to move into and out of said open end of said tubular fixed supporting means, said movable supporting means comprising a guiding means and at least one of said fixed supporting means having disposed therein a receiving means adapted to engage said guiding means when said switch is closed said receiving means having bearing surfaces thereon, the other of said fixed supporting means including therein a third fixed supporting means for supporting said movable supporting means, said third fixed supporting means being insulated from said other fixed supporting means and insulating said movable supporting means from said other fixed supporting means when said switch is opened.

3. An electric switch as claimed in claim 2 wherein each of said first and second fixed supporting means comprises a wall with an inner and outer surface, said receiving means being secured to said inner surface of said wall of said second fixed supporting means.

4. An electric switch as claimed in claim 3 wherein said receiving means and said third fixed supporting means are each generally disc-shaped and have an outer diameter, said third fixed supporting means having a central opening, said receiving means having a recess for engaging said guiding means.

5. An electric switch as claimed in claim 4 wherein said recess is a centrally located recess which is symmetrical about said common centerline.

6. An electric switch as claimed in claim 5 wherein said central recess comprises a generally cylindrical opening in said disc, said opening comprising a truncated conical shape, said guiding means comprising a complementary conical shape which is symmetrical about said common centerline, said central opening in said third supporting member being cylindrically shaped, said movable supporting means comprising a main body, said conical shaped guiding means being disposed at one end of said main body, said one end of said main body being the one nearer to said receiving means, a cylindrically shaped guide rod disposed at the opposite end of said main body and having a common central centerline with respect to said main body.

7. An electric switch as claimed in claim 6 wherein said first and second fixed supporting means comprise curved electrical conductors, said first mentioned electrically conducting contacting means comprise first and second curved metallic conductors of generally equal size each having an inner and an outer diameter and corresponding inner and outer surfaces, said outer diameter of each of said curved metallic conductors generally corresponding to said inner diameter of said first and second fixed supporting means, said first curved metallic conductor being secured to said inner surface of said first fixed supporting means and being positioned relatively closer than said receiving means to the open end of said first fixed supporting means, said second ring shaped metallic conductor being secured to said inner surface of said second fixed supporting means and being positioned closer than the said third supporting means to the open end of said second fixed supporting means.

8. An electric switch comprising first and second hollow, tubular, electrically conducting, generally fixed supporting means having generally circular peripheries with generally equal respective inner and outer diameters, said tubular supporting means being spaced along a common center line and being open at both ends, each of said fixed supporting means having secured thereto a first pair of electrically conducting contacting means, said first pair of electrically conducting contacting means comprising first and second ring shaped metallic conductors with one for each fixed supporting means, each ring shaped conductor having an inner and outer diameter and corresponding inner and outer surfaces, said outer diameter of each of said curved metallic conductors generally corresponding to said inner diameter of said first and second fixed supporting means, said first ring shaped metallic conductor being secured to said inner surface of said first fixed supporting means, a movable supporting means actuable to move into and out of said opened end of said hollow, tubular fixed supporting means, said movable supporting means comprising a guiding means, and at least one said fixed supporting means comprising a receiving means disposed to engage said guiding means when said switch is closed, said receiving means having bearing surfaces thereon, each of said first and second fixed supporting means comprising a wall having an inner and outer surface said receiving means being generally disc-shaped with an outer diameter, a third fixed disc-shaped supporting means having therein a central opening, said receiving means having a centrally located recess for engaging said guiding means which recess is symmetrical about said common center line, said recess comprising a truncated conical shape, said receiving means being secured to said inner-surface of said wall of said second fixed supporting means of said receiving means outer diameter, said movable supporting means having mounted thereon a movable engaging means, said movable engaging means having disposed thereon a second electrically conducting contacting means, said movable supporting means being actuable to move to actuate said movable engaging means to move and to thereby cause said second conducting contacting means to engage both of said first contacting means on said fixed supporting means to thereby provide electrical continuity from one of said first contacting means to the other of said first contacting means through a portion of said movable bridge mean the first of said fixed supporting means including therein a third fixed supporting means for supporting said movable supporting means, said guiding means comprising a complementary conic shape with respect to said truncated conic shape in said receiving means, said complementary conic shape being symmetrical about said common center line, said central opening in said third supporting means being cylindrically shaped, said movable supporting means comprising a main body, said conical shaped guiding means being disposed at one end of said main body, said one end of said main body being the one nearer to said receiving means, a cylindrically shaped guide rod disposed at the opposite end of said main body and having a common central center line with respect to said main body, said first ring shaped metallic conductor of said first fixed supporting means being secured to said first fixed supporting means at a position relatively closer than said receiving means to the open end of said first fixed supporting means, said second ring-shaped metallic conductor being secured to said inner surface of said second fixed supporting means and being positioned closer than the said third supporting means to the open end of said second fixed supporting means.

9. An electric switch as claimed in claim 8 wherein said main body of said movable supporting means comprises an elongated metallic structure, said plurality of engaging sections including four of said engaging sections, each of said engaging sections comprising a pair of anchoring means each including inner and outer anchoring means and a connecting means disposed between corresponding inner and outer anchoring means, each of said inner anchoring means being secured to said movable supporting means.

10. A switch as claimed in claim 9 wherein said inner anchoring means of each pair of anchoring means comprises forward and rear inner anchors spaced longitudinally along said movable supporting means, said outer anchoring means of each pair of anchoring means comprising forward and rear outer anchors spaced longitudinally along said second electrically conducting contacting means, each of said outer anchors comprising a pair of anchoring blocks, the spacing between said forward and rear inner anchors and said forward and rear outer anchors being generally equal, said connecting means of each pair of anchoring means comprising first and second connecting rods, said forward inner and outer anchors being connected by said first connecting rod with said first connecting rod being pivotally connected to both of said forward anchoring blocks, said rear inner and outer anchors being connected by said second connecting rod with said second connecting rod being pivotally connected to both of said rear anchoring blocks, said second contacting means comprising a plurality of a flexible curved metallic generally rectangular shaped conducting plates supported on the respective engaging sections, each plate having rear and front contacts, each of said curved plates being secured at each corner to one of said anchoring blocks with two of said front anchoring blocks being disposed adjacent to one end of said plate and two of said rear anchoring blocks being disposed adjacent to the other end of said plate each of said front anchoring blocks having a leading surface, said forward and rear outer anchors each comprising a main cylindrical member with two smaller cylindrical members disposed to extend axially away from the ends of said main cylindrical member, said anchoring blocks having means for receiving said smaller cylindrical members, said connecting rods each being mounted generally perpendicular to said main cylindrical member, said movable supporting means having disposed thereon an abutting means, a plate through which said supporting means passes, a resilient means mounted around said movable supporting means between said abutting means and said plate to bias said plate away from said abutting means, said curved rectangular plate having attached thereto stop means, said stop means being disposed to engage and prevent longitudinal motion of said plate away from said abutting means, said contacting plates and said engaging sections being in collapsed positions when said switch is open, and remaining collapsed until after said guiding means has made initial contact with said receiving means when said movable supporting means is actuated during a closing operation of said switch, thereafter said leading surfaces of said front anchoring blocks contacting said bearing surfaces of said receiving means, with said guiding means passing through said cylindrical opening in said receiving means, continued actuation of said movable supporting means causing each of said forward anchoring blocks to move radially outwardly along said bearing surface of said receiving means to actuate the outer ends of said connecting rods to rotate away from said movable supporting means and to actuate said second contacting means to move outwardly until contact is initially made tangentially at one point of each engaging section between said second contacting means and said pair of first-mentioned contacting means, said flexible conducting plates then being forced against the remainder of said contacting surface of said pair of fixed contacting rings in the final movement of said movable supporting means during a closing operation of said switch, said final movement actuating said connecting rods to force said anchoring means to move further radially outwardly with said resilient means being simultaneously compressed between said pressure plate and said abutting means.

11. A switch as claimed in claim 10 wherein said first and second fixed supporting means and said movable supporting means are mounted inside and insulated from an enclosing pipe, said pipe being substantially filled with an insulating fluid.

12. An electrical switch comprising a generally cylindrical hollow housing, cylindrical conductors spaced longitudinally from one another along substantially a common axis; means for supporting said conductors substantially within said housing, at least one of said conductors being hollow at the end adjacent to the other conductor, a bridging assembly disposed substantially entirely inside said hollow end of said one of said conductors when said switch is open, said bridging assembly including an axially extending central drive shaft, means connected to said drive shaft for actuating said bridging assembly axially toward and away from said other conductor, a plurality of generally arcuate, electrically conducting plates mounted on said shaft and being generally radially movable with respect to said shaft between predetermined positions, means disposed adjacent to one end of said other conductor for receiving one end of said shaft and to assist in guiding the axial movement of said shaft, said conducting plates extending axially between said conductors when said one end of said shaft engages said receiving means and being radially actuable to engage both of said conductors.

* * * * *